(12) United States Patent  
Lackner

(10) Patent No.: US 12,083,478 B2  
(45) Date of Patent: Sep. 10, 2024

(54) SYSTEM AND METHOD FOR PRODUCTION OF SYNTHETIC FUEL THROUGH $CO_2$ CAPTURE AND WATER SPLITTING

(71) Applicant: ARIZONA BOARD OF REGENTS ON BEHALF OF ARIZONA STATE UNIVERSITY, Scottsdale, AZ (US)

(72) Inventor: Klaus Lackner, Paradise Valley, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 518 days.

(21) Appl. No.: 17/428,965

(22) PCT Filed: Feb. 5, 2020

(86) PCT No.: PCT/US2020/016864  
§ 371 (c)(1),  
(2) Date: Aug. 5, 2021

(87) PCT Pub. No.: WO2020/163513  
PCT Pub. Date: Aug. 13, 2020

(65) Prior Publication Data  
US 2022/0118406 A1 Apr. 21, 2022

Related U.S. Application Data

(60) Provisional application No. 62/801,356, filed on Feb. 5, 2019.

(51) Int. Cl.  
*B01D 53/96* (2006.01)  
*B01D 53/62* (2006.01)  
(Continued)

(52) U.S. Cl.  
CPC ........... *B01D 53/965* (2013.01); *B01D 53/62* (2013.01); *B01D 53/78* (2013.01); *C25B 1/04* (2013.01);  
(Continued)

(58) Field of Classification Search  
CPC ....................................................... C25B 1/23  
See application file for complete search history.

(56) References Cited

U.S. PATENT DOCUMENTS 4,041,129 A * 8/1977 Foster .................... C10K 1/122  
423/234  
4,049,519 A * 9/1977 Sloan ..................... B01D 61/44  
204/522

(Continued)

OTHER PUBLICATIONS

Ipatieff, V. N., et al., "Synthesis of Methanol from Carbon Dioxide and Hydrogen over Copper-Alumina Catalysts. Mechanism of Reaction", Journal of the American Chemical Society, 67(12):2168-2171 (1945).

(Continued)

*Primary Examiner* — Harry D Wilkins, III  
(74) *Attorney, Agent, or Firm* — BOOTH UDALL FULLER, PLC

(57) ABSTRACT

A system for producing gas streams for use in synthetic fuel production through CO2 capture and water splitting is disclosed. The system includes a CO2 capture device configured to receive a CO2-containing stream and including an aqueous alkaline solution. The alkaline solution includes hydroxide and/or carbonate ions. The CO2 capture device generates a carbon-rich solution when the alkaline solution absorbs CO2. The carbon-rich solution includes carbonate and/or bicarbonate ions. The system also includes an electrolyzer fluidically coupled to the CO2 capture device, and defining a volume including an anode region having an anode, and a cathode region having a cathode. The volume (Continued)

includes an electrolyte solution having a pH gradient generated by an electric current, causing the electrolyte solution to be acidic in the anode region and alkaline in the cathode region. The carbon-rich solution is received into the electrolyzer. The electrolyzer generates hydrogen, oxygen, and CO2 streams.

18 Claims, 4 Drawing Sheets

(51) Int. Cl.
  *B01D 53/78* (2006.01)
  *C25B 1/04* (2021.01)
  *C25B 1/50* (2021.01)
  *C25B 9/19* (2021.01)
  *C25B 15/08* (2006.01)

(52) U.S. Cl.
  CPC ............... *C25B 1/50* (2021.01); *C25B 9/19* (2021.01); *C25B 15/087* (2021.01); *B01D 2251/304* (2013.01); *B01D 2251/306* (2013.01); *B01D 2251/606* (2013.01); *B01D 2257/504* (2013.01)

(56) References Cited

U.S. PATENT DOCUMENTS

| | | | |
|---|---|---|---|
| 4,197,421 | A | 4/1980 | Steinberg |
| 8,133,305 | B2 | 3/2012 | Lackner et al. |
| 11,421,331 | B2* | 8/2022 | DiMascio ............... C01B 32/50 |
| 2003/0141200 | A1* | 7/2003 | Harada ..................... C25B 1/04 205/637 |
| 2007/0045125 | A1* | 3/2007 | Hartvigsen ............... C25B 1/00 205/637 |
| 2010/0084280 | A1* | 4/2010 | Gilliam .................. C01B 32/60 205/555 |
| 2011/0210012 | A1* | 9/2011 | Sioli ........................ C25B 1/04 205/742 |
| 2014/0151240 | A1 | 6/2014 | Bedell |
| 2017/0058409 | A1* | 3/2017 | Kumar ..................... C25B 9/23 |
| 2017/0175277 | A1* | 6/2017 | von Olshausen ......... C25B 9/05 |
| 2022/0118406 | A1 | 4/2022 | Lackner |

OTHER PUBLICATIONS

Izumi, Yasuo, "Recent advances in the photocatalytic conversion of carbon dioxide to fuels with water and/or hydrogen using solar energy and beyond", Coordination Chemistry Reviews, 257:171-186 (2013).

Lackner, K.S., "Capture of carbon dioxide from ambient air", Eur. Phys. J. Special Topics, 176:93-106 (2009).

* cited by examiner

US 12,083,478 B2

SYSTEM AND METHOD FOR PRODUCTION OF SYNTHETIC FUEL THROUGH $CO_2$ CAPTURE AND WATER SPLITTING

CROSS-REFERENCE TO RELATED APPLICATIONS

This application is the U.S. National Stage of International Application No. PCT/US2020/016864, filed Feb. 5, 2020, which claims priority to and the benefit of U.S. Provisional Patent Application Nos. 62/801,356 entitled "SYSTEM AND METHOD FOR PRODUCTION OF SYNTHETIC FUEL THROUGH $CO_2$ CAPTURE AND WATER SPLITTING," filed Feb. 5, 2019, the contents of each of which are hereby incorporated by reference in their entireties.

TECHNICAL FIELD

Embodiments described herein relate generally to systems and methods for producing synthetic fuel via capture of carbon dioxide and water splitting.

BACKGROUND

Although the importance of removing carbon dioxide from the atmosphere has been well established, a number of factors stand as obstacles. The technology is still new, and is often both expensive and fragile. Conventional capture devices also tend to have large initial capital costs in addition to high operating costs. The economic viability of $CO_2$ capture devices can be improved by reducing the cost of the devices, creating a new revenue stream from high value products produced from the captured $CO_2$, or both.

SUMMARY

Embodiments described herein relate generally to systems and methods for the production of gas for synthetic fuel through $CO_2$ capture and water splitting. The system includes a $CO_2$ capture device that receives a $CO_2$-containing stream and an aqueous alkaline solution. The aqueous alkaline solution includes hydroxide ions and/or carbonate ions and absorbs $CO_2$ from the $CO_2$-containing stream to generate a carbon-rich solution. The carbon-rich solution includes carbonate ions and/or bicarbonate ions. The system further includes an electrolyzer fluidically coupled to the $CO_2$ capture device. The electrolyzer includes an anode region, a cathode region, and an electrolyte solution. The electrolyzer generates a pH gradient in the electrolyte solution when an electrolyte current is applied to the electrolyzer, such that the electrolyte solution is acidic in the anode region and alkaline in the cathode region. The electrolyzer also receives the carbon-rich solution in an incoming stream and generates hydrogen, oxygen, and $CO_2$ gas streams.

DETAILED DESCRIPTION

Figure 1:
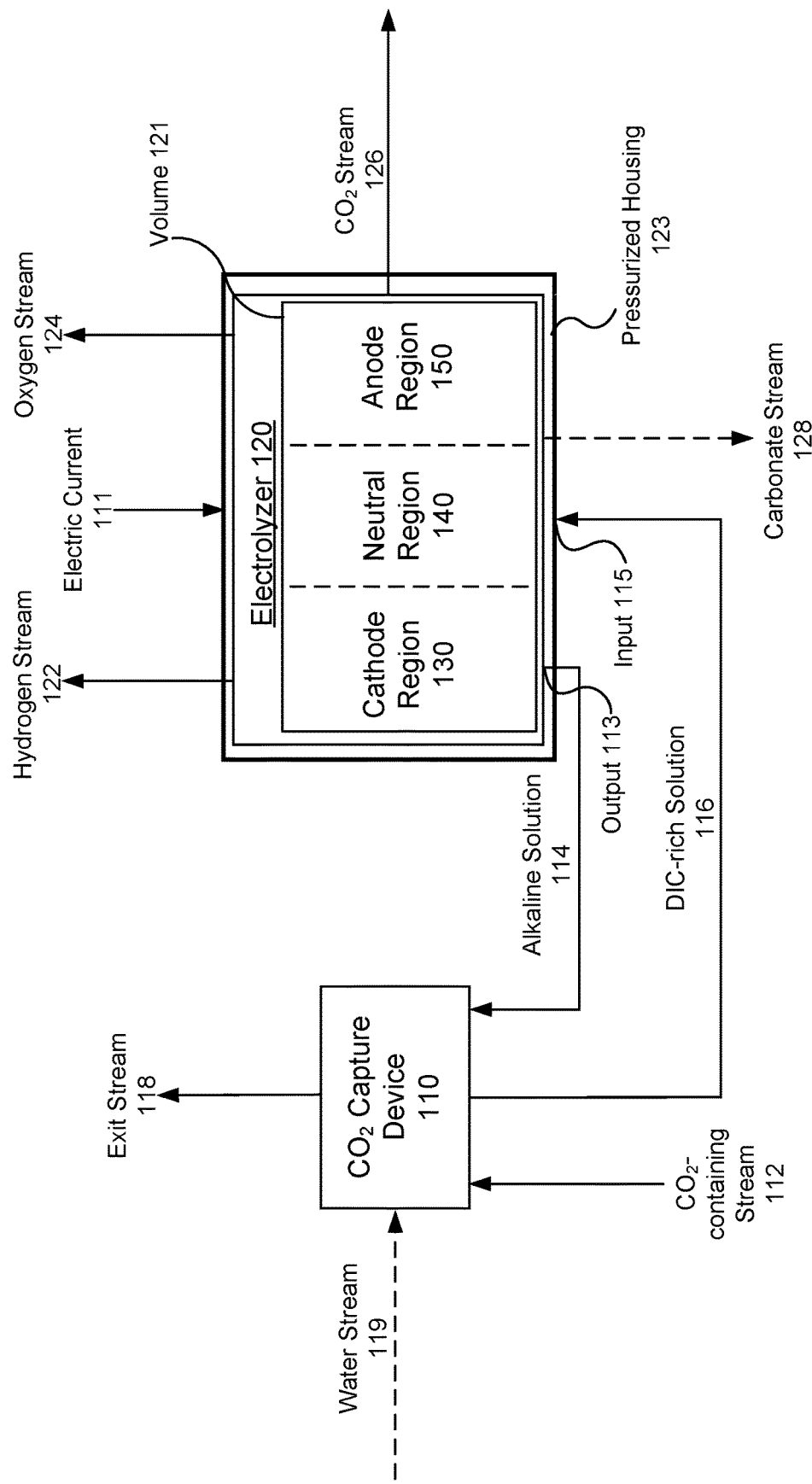
FIG. 1 is a schematic illustration of a system for production of gas streams that can be used to produce synthetic fuel through $CO_2$ capture and water splitting, according to an embodiment.

Embodiments described herein relate generally to systems and methods for the production of synthetic fuel through $CO_2$ capture and water splitting. In some embodiments, the system includes a $CO_2$ capture device and an electrolyzer. A $CO_2$-containing gas stream can flow into the $CO_2$ capture device and contact an alkaline solution that flows into the $CO_2$ capture device via a separate stream. In the $CO_2$ capture device, the alkaline solution captures $CO_2$ after direct or indirect contact with a $CO_2$-containing gas stream. Upon capturing the $CO_2$, the alkaline solution transforms into a dissolved inorganic carbon (DIC) rich solution (referred to herein also as a carbon-rich solution), which can then flow into the electrolyzer. In some embodiments, the DIC-rich solution can have a higher $CO_2$ concentration than the $CO_2$-containing gas stream. In some embodiments, the DIC-rich solution can have a greater mass flow rate of $CO_2$ than the $CO_2$-containing gas stream. Upon removal of $CO_2$ from the $CO_2$-containing stream, the $CO_2$-containing stream transforms into an effluent stream. The exit stream leaves the $CO_2$ capture device with a lower total flow rate of $CO_2$ than the total flow rate of $CO_2$ in the $CO_2$-containing stream flowing into the $CO_2$ capture device. In some embodiments, a water stream can flow into the system to supply make-up water consumed either in the $CO_2$ capture device or the electrolyzer.

The electrolyzer, in addition to producing hydrogen and oxygen gas streams, can produce a $CO_2$ stream with relatively high purity. The electrolyzer includes an electrolyte solution. When an electrical current is applied to the electrolyzer, the electrolyte solution has a pH gradient and several ionic concentration gradients. In some embodiments, the electrolyzer can include one or more dividers that partition the electrolyzer into a discrete anode region and a discrete cathode region. In some embodiments, the dividers can partition the electrolyzer into a discrete anode region, a discrete cathode region, and a discrete neutral region between the anode region and the cathode region. The electrolyte acts as an anolyte in the anodic region and a catholyte in the cathodic region. In some embodiments, the composition of the anolyte and the catholyte can be engineered to maximize the pH gradient across the electrolyzer and the yield of gas products from the electrolyzer. The aforementioned DIC-rich solution can flow into the electrolyzer, while the aforementioned alkaline solution can flow out of the electrolyzer. In some embodiments, a carbonate stream can flow out of the electrolyzer for further processing.

The removal of $CO_2$ from air, engine exhaust, bodies of water, or other sources of $CO_2$ can aid in combatting climate change. Several systems and processes currently exist for $CO_2$ capture. Examples include moisture swing apparatus and activated carbon adsorption. Additional examples of apparatus used for $CO_2$ capture are described in U.S. Pat. No. 8,133,305 entitled, "REMOVAL OF CARBON DIOXIDE FROM AIR," filed Nov. 5, 2008 ("the '305 patent"), the disclosure of which is incorporated herein by reference in its entirety.

While the capture of $CO_2$ from various sources provides environmental benefits, $CO_2$ capture by itself is typically not economically viable. With the use of additional chemical processes, high-value products can be developed from captured $CO_2$. However, such chemical processes typically require significant energy input. Energy can be introduced into an electrolyzer to split water into hydrogen and oxygen. By combining a $CO_2$ capture device or system with an electrolyzer; $CO_2$, oxygen, and hydrogen gas streams with high purity can be produced. In some embodiments, the energy introduced into the electrolyzer can be partially or substantially renewable (e.g., solar, wind, geothermal, etc.). The hydrogen stream, and the energy associated with the hydrogen, can effect subsequent reactions and chemical transformations and aid in the development of high-value products. This can improve both the economic and thermodynamic favorability of $CO_2$ capture systems and processes.

There is a wide range of useful chemicals that can be formed from the hydrogen and $CO_2$ derived from systems described herein. Examples include, but are not limited to, methane from hydrogen and $CO_2$ (i.e., the Sabatier reaction: $CO_2+4H_2 \rightarrow CH_4+2H_2O+165$ kJ/mol), methanol from hydrogen and $CO_2$ (i.e., $CO_2+3H_2 \rightarrow H_3COH+H_2O+130.7$ kJ/mol), and syngas from hydrogen and $CO_2$ (i.e., reverse water gas shift: $CO_2+H_2 \rightarrow CO+H_2O+2.8$ kJ/mol). Other examples of fuels or fuel precursors that may be produced from hydrogen and $CO_2$ include, but are not limited to, dimethyl-ether, formic acid, ethylene, ethylene oxide, mixtures like gasoline, diesel, kerosene or jet fuel, or other hydrocarbons, alcohols, ethers, ketones, or organic acids. Additional examples of systems and methods used for the conversion of hydrogen and $CO_2$ into high-value fuel are described in V. N. Ipatieff, and C. J. S. Monroe, Synthesis of methanol from carbon dioxide and hydrogen over copper-alumina catalysts. Mechanism of reaction, *Journal of the American Chemical Society*, 67, no. 12 (1945): 2168-2171, Y. Izumi, Recent advances in the photocatalytic conversion of carbon dioxide to fuels with water and/or hydrogen using solar energy and beyond, *Coordination Chemistry Reviews*, 257, no. 1 (2013): 171-186, and U.S. Pat. No. 8,133,926 entitled, "CONVERSION OF CARBON DIOXIDE TO DIMETHYL ETHER USING BI-REFORMING OF METHANE OR NATURAL GAS" filed Jun. 19, 2008 ("the '926 patent"), the disclosures of which are incorporated herein by reference in their entirety.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or centerline that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used in this specification, "dissolved inorganic carbon (DIC)" can include dissolved $CO_2$, bicarbonate ions ($HCO_3^-$), carbonate ions ($CO_3^{2-}$), and other molecular species that bind $CO_2$, $HCO_3^-$ and $CO_3^{2-}$ in aqueous solution.

FIG. 1 is a schematic illustration of a system 100 for production of synthetic fuel through $CO_2$ capture and water splitting, according to an embodiment. The system circulates fluids between a $CO_2$ capture device 110 that absorbs $CO_2$ and an electrolyzer 120 that electrolyzes DIC-containing water to produce $CO_2$, hydrogen, and oxygen.

The $CO_2$ capture device 110 is configured to receive a $CO_2$-containing stream 112 through an input 115, which is then either directly or indirectly exposed to an alkaline solution 114. In some embodiments, the input 115 may be a conduit or channel, while in others it may be an aperture through which fluid communication between the electrolyzer 120 and capture device 110 is possible. In some embodiments, the $CO_2$ capture device 110 is fluidically coupled (e.g., via a conduit) to the electrolyzer 120 such that wherein the alkaline solution 114 is received from the electrolyzer 120 through an output 113 of the electrolyzer 120. In some embodiments, the output 113 may be a conduit or channel, while in others it may be an aperture through which fluid communication between the electrolyzer 120 and capture device 110 is possible. The $CO_2$ capture device 110 is also fluidically coupled to the electrolyzer 120 via another conduit such that the $CO_2$ capture device 110 can deliver a DIC-rich solution 116 to the electrolyzer 120. The $CO_2$ capture device 110 also expels an exit stream 118 with a lower total amount of $CO_2$, when compared to the $CO_2$-containing stream 112. In some embodiments, a water stream 119 can flow into the system 100 (e.g., to the $CO_2$ capture device 110, the electrolyzer 120, or elsewhere) to supply make-up water consumed either in the $CO_2$ capture device 110 or the electrolyzer 120.

In some embodiments, the $CO_2$ capture device 110 can directly expose the $CO_2$-containing stream 112 to the alkaline solution 114. The alkaline solution 114 absorbs substantially all or a portion of the $CO_2$ from the $CO_2$-containing stream 112. This works to remove $CO_2$ from the $CO_2$-containing stream 112 while simultaneously lowering the pH of the alkaline solution 114 and transforming the alkaline solution 114 into the DIC-rich solution 116. In some embodiments, the $CO_2$ capture device 110 can include an intermediary sorbent or sorbent system that contacts the alkaline solution and absorbs $CO_2$ from the $CO_2$-containing stream 112, such that the alkaline solution 114 does not directly contact the $CO_2$-containing stream 112. In some embodiments, the intermediary sorbent can include activated hydrophobic carbon. In some embodiments, heat can be applied to the intermediary sorbent or sorbent system during $CO_2$ absorption to facilitate $CO_2$ transfer.

In some embodiments, the $CO_2$-containing stream 112 can include an ambient air stream, $CO_2$ at higher concentration derived from an ambient air stream, or any other gaseous or liquid stream that contains $CO_2$. In some embodiments, the $CO_2$-containing stream 112 can include exhaust from an engine or a power plant from a biological process producing $CO_2$, as for example from a fermenter, from a calciner, or from $CO_2$ produced inside buildings by human occupants or animals. Other sources include calciners, industrial processes, etc. For example, in a factory where liquid or gaseous fuels are produced from $CO_2$ and hydrogen, it may be advantageous to consume some of the liquid or gaseous fuel to deliver electricity when solar electricity is not in sufficient supply. The exhaust gas from such a factory may be processed for recovering all or some of the produced $CO_2$ so that it can be reconverted to fuel at a later time. In some embodiments, the $CO_2$-containing stream 112 can include any combination of the aforementioned sources.

In some embodiments, the $CO_2$-containing stream 112 can have a $CO_2$ concentration significantly lower than the $CO_2$ concentration of ambient outdoor air. Streams with $CO_2$ concentrations significantly below those of ambient outdoor air can be processed in order to clean up the streams. In such cases, $CO_2$ is a byproduct of the cleaning process. An example would be removing $CO_2$ from air prior to liquefaction. In some embodiments, the $CO_2$-containing stream 112 can have a $CO_2$ concentration significantly greater than the $CO_2$ concentration of ambient outdoor air. Streams with $CO_2$ concentrations higher or equal to that of air may be processed for the primary purpose of producing a stream of $CO_2$. In some embodiments, the $CO_2$-containing stream 112 can have a $CO_2$-concentration of at least about 10 ppm, at least about 50 ppm, at least about 100 ppm, at least about 200 ppm, at least about 300 ppm, at least about 400 ppm, at least about 500 ppm, at least about 600 ppm, at least about 700 ppm, at least about 800 ppm, at least about 900 ppm, at least about 0.1 vol %, at least about 0.5 vol %, at least about 1 vol %, at least about 5 vol %, at least about 10 vol %, at least about 20 vol %, at least about 30 vol %, at least about 40 vol %, at least about 50 vol %, at least about 60 vol %, at least about 70 vol %, at least about 80 vol %, at least about 90 vol %, at least about 95 vol %, at least about 96 vol %, at least about 97 vol %, at least about 98 vol %, or at least about 99 vol %. In some embodiments, the $CO_2$-containing stream 112 can have a $CO_2$ concentration of no more than about 100 vol %, no more than about 99 vol %, no more than about 98 vol %, no more than about 97 vol %, no more than about 96 vol %, no more than about 95 vol %, no more than about 90 vol %, no more than about 80 vol %, no more than about 70 vol %, no more than about 60 vol %, no more than about 50 vol %, no more than about 40 vol %, no more than about 30 vol %, no more than about 20 vol %, no more than about 10 vol %, no more than about 5 vol %, no more than about 1 vol %, no more than about 0.5 vol %, no more than about 0.1 vol %, no more than about 900 ppm, no more than about 800 ppm, no more than about 700 ppm, no more than about 600 ppm, no more than about 500 ppm, no more than about 400 ppm, no more than about 300 ppm, no more than about 200 ppm, no more than about 100 ppm, or no more than about 50 ppm. Combinations of the above referenced $CO_2$ concentration ranges in the $CO_2$-containing stream 112 are also possible (e.g., at least about 10 ppm and no more than about 100 vol % or at least about 300 ppm and no more than about 90 vol %), inclusive of all values and ranges therebetween. In some embodiments, the $CO_2$-containing stream 112 can have a $CO_2$ concentration of about 10 ppm, about 50 ppm, about 100 ppm, about 200 ppm, about 300 ppm, about 400 ppm, about 500 ppm, about 600 ppm, about 700 ppm, about 800 ppm, about 900 ppm, about 0.1 vol %, about 0.5 vol %, about 1 vol %, about 5 vol %, about 10 vol %, about 20 vol %, about 30 vol %, about 40 vol %, about 50 vol %, about 60 vol %, about 70 vol %, about 80 vol %, about 90 vol %, about 95 vol %, about 96 vol %, about 97 vol %, about 98 vol %, about 99 vol %, or about 100 vol %.

The alkaline solution 114 includes alkalizing ions. In some embodiments, the alkalizing ions can include hydroxide ions, carbonate ions, phosphate ions, ammonium ions, polyprotic organic acids, citrate ions, or any other suitable alkalizing ions. In some embodiments, the alkaline solution 114 can be aqueous. In some embodiments, the counter-ion to the alkalizing ions can be an alkali metal (e.g., sodium, potassium, etc.), an alkaline earth metal (e.g., magnesium, calcium, etc.), or any other suitable counter-ion. In some embodiments, the alkaline solution 114 can include dissolved sodium hydroxide, and can absorb $CO_2$ to form sodium carbonate via chemical equation 1.

$$2NaOH(aq) + CO_2(g) \rightleftharpoons Na_2CO_3(aq) + H_2O(l) \tag{1}$$

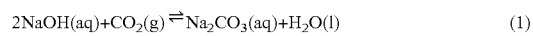

In some embodiments, the alkaline solution 114 can be in contact with a moisture swing sorbent that transfers $CO_2$ from the $CO_2$-containing stream 112 to the alkaline solution 114. In some embodiments, the $CO_2$ capture device 110 can apply a moisture swing sorbent to absorb $CO_2$ in the $CO_2$ capture device 110 when the alkaline solution 114 is exposed to open air and regenerate the sorbent in the presence of water vapor (e.g., delivered by the alkaline solution 114). In some embodiments, the moisture swing sorbent can include a moisture swing active membrane that transports $CO_2$ from the side of the membrane with the $CO_2$-containing stream 112 to the side of the membrane with the alkaline solution 114. In some embodiments, the $CO_2$ capture device 110 can employ a hollow fiber filter that is exposed to and absorbs $CO_2$ from the $CO_2$-containing stream 112. In some embodiments, the alkaline solution 114 can include additives and/or promoters to enhance and/or speed up $CO_2$ absorption from the $CO_2$-containing stream 112 and/or $CO_2$ desorption from the alkaline solution 114. See, for example, additive 215 of FIG. 2. In some embodiments, the alkaline solution 114 can include a sodium carbonate/bicarbonate solution that is enriched with carbonic anhydrase to speed up the liquid gas transfer between the $CO_2$-containing stream 112 and the alkaline solution 114. In some embodiments, the alkaline solution 114 can include a sodium carbonate/bicarbonate solution that is enriched with phosphates to speed up the liquid gas transfer between the $CO_2$-containing stream 112 and the alkaline solution 114. In some embodiments, the alkaline solution 114 can be converted into a bicarbonate-rich solution during $CO_2$ capture. In some embodiments, the alkaline solution 114 can be converted into a carbonate-rich solution during $CO_2$ capture.

In some embodiments, the alkaline solution 114 can include dissolved potassium hydroxide. In some embodiments, the alkalizing ions can have a concentration in the alkaline solution 114 of at least about 0.5 mM, at least about 1 mM, at least about 5 mM, at least about 10 mM, at least about 50 mM, at least about 100 mM, at least about 500 mM, at least about 1 M, at least about 2 M, at least about 3 M, at least about 4 M, at least about 5 M, at least about 6 M, at least about 7 M, at least about 8 M, or at least about 9 M. In some embodiments, the alkalizing ions can have a concentration in the alkaline solution 114 of no more than about 10 M, no more than about 9 M, no more than about 8 M, no more than about 7 M, no more than about 6 M, no more than about 5 M, no more than about 4 M, no more than about 3

M, no more than about 2 M, no more than about 1 M, no more than about 500 mM, no more than about 100 mM, no more than about 50 mM, no more than about 10 mM, no more than about 5 mM, or no more than about 1 mM. Combinations of the above-referenced concentrations of alkalizing ions in the alkaline solution 114 are also possible (e.g., at least about 0.5 mM and no more than about 10 M or at least about 1 mM and no more than about 500 mM). In some embodiments, the alkalizing ions can have a concentration in the alkaline solution 114 of about 0.5 mM, about 1 mM, about 5 mM, about 10 mM, about 50 mM, about 100 mM, about 500 mM, about 1 M, about 2 M, about 3 M, about 4 M, about 5 M, about 6 M, about 7 M, about 8 M, about 9 M, or about 10 M.

In some embodiments, the rate of $CO_2$ transfer between the $CO_2$-containing stream 112 and the alkaline solution 114 can be a function of the contact area between the $CO_2$-containing stream 112 and the alkaline solution 114 (or the contact area between the $CO_2$-containing stream 112 and any intermediary sorbent and the contact area between any intermediary sorbent and the alkaline solution 114), the temperature of the $CO_2$ capture device 110, the relative flow rates of the alkaline solution 114 and the $CO_2$-containing stream 112, and any other factors that affect $CO_2$ diffusion and $CO_2$ uptake. Additionally, $CO_2$ transfer between the $CO_2$-containing stream 112 and the alkaline solution 114 is a function of the pH of the alkaline solution 114, as a higher pH allows for both higher possible carbon uptake per unit volume of solution and drives a higher reaction rate. In some embodiments, the alkaline solution 114 can include a buffer to maintain a high pH.

In some embodiments, the alkaline solution 114 can have a pH of at least about 10, at least about 10.5 at least about 11, at least about 11.5, at least about 12, at least about 12.5, at least about 13, at least about 13.5, at least about 14. In some embodiments, the alkaline solution 114 can have a pH of no more than about 15, no more than about 14.5, no more than about 14, no more than about 13.5, no more than about 13, no more than about 12.5, no more than about 12, no more than about 11.5, no more than about 11, or no more than about 10.5. Combinations of the above-referenced pH-values for the alkaline solution 114 are also possible (e.g., at least about 10 and no more than about 15 or at least about 12 and no more than about 13), inclusive of all values and ranges therebetween. In some embodiments, the alkaline solution 114 can have a pH of about 10, about 10.5, about 11, about 11.5, about 12, about 12.5, about 13, about 13.5, or about 14.

In some embodiments, the alkaline solution 114 can include DIC, in the form of carbonate and/or bicarbonate. In some embodiments, the alkaline solution 114 can be free or substantially free of DIC. In some embodiments, DIC concentration can be defined as the number of moles of carbon per liter of solution. In some embodiments, the alkaline solution 114 can have a DIC concentration of at least about 0.1 mM, at least about 0.5 mM, at least about 1 mM, at least about 5 mM, at least about 10 mM, at least about 50 mM, at least about 100 mM, at least about 500 mM, at least about 1 M, or at least about 2 M. In some embodiments, the alkaline solution 114 can have a DIC concentration can be no more than about 3 M, no more than about 2 M, no more than about 1 M, no more than about 500 mM, no more than about 100 mM, no more than about 50 mM, no more than about 10 mM, no more than about 5 mM, no more than about 1 mM, or no more than about 0.5 mM. Combinations of the above-referenced concentrations DIC concentration in the alkaline solution 114 are also possible (e.g., at least about 0.1 mM and no more than about 3 M or at least about 1 mM and no more than about 500 mM). In some embodiments, the alkaline solution 114 can have a DIC concentration of about 0.1 mM, about 0.5 mM, about 1 mM, about 5 mM, about 10 mM, about 50 mM, about 100 mM, about 500 mM, or about 1 M, about 2 M, or about 3 M.

As described above, the DIC-rich solution 116 results from the absorption of $CO_2$ by the alkaline solution 114 upon exposure to the $CO_2$-containing stream. In some embodiments, the DIC-rich solution 116 can have a pH of at least about 8, at least about 8.5, at least about 9, at least about 9.5, at least about 10, at least about 10.5, at least about 11, at least about 11.5, at least about 12, at least about 12.5, at least about 13, or at least about 13.5. In some embodiments, the DIC-rich solution 116 can have a pH of no more than about 14, no more than about 13.5, no more than about 13, no more than about 12.5, no more than about 12, no more than about 11.5, no more than about 11, no more than about 10.5, no more than about 10, no more than about 9.5, no more than about 9, or no more than about 8.5. Combinations of the above-referenced pH-values for the DIC-rich solution 116 are also possible (e.g., at least about 8 and no more than about 14 or at least about 10 and no more than about 13), inclusive of all values and ranges therebetween. In some embodiments, the DIC-rich solution 116 can have a pH of about 8, about 8.5, about 9, about 9.5, about 10, about 10.5, about 11, about 11.5, about 12, about 12.5, about 13, about 13.5, or about 14.

In some embodiments, the DIC-rich solution 116 can include carbonate ions, bicarbonate ions, or any other suitable DIC species. In some embodiments, the counter-ion to the DIC species in the DIC-rich solution 116 can include one or more alkali metals (e.g., sodium, potassium, etc.), one or more alkaline earth metals (e.g., magnesium, calcium, etc.), or any other suitable counter-ion. In some embodiments, the DIC-rich solution 116 can be produced or obtained from outside the system 100. In some embodiments, the DIC-rich solution 116 can be stored in a tank for later introduction into the electrolyzer 120 under more advantageous conditions (e.g., when intermittent electrical power is available to power the electrolyzer 120).

In some embodiments, the DIC species can have a concentration in the DIC-rich solution 116 of at least about 0.1 mM, at least about 0.5 mM, at least about 1 mM, at least about 5 mM, at least about 10 mM, at least about 50 mM, at least about 100 mM, at least about 500 mM, at least about 1 M, or at least about 2 M. In some embodiments, the DIC species can have a concentration in the DIC-rich solution 116 of no more than about 3 M, no more than about 2 M, no more than about 1 M, no more than about 500 mM, no more than about 100 mM, no more than about 50 mM, no more than about 10 mM, no more than about 5 mM, no more than about 1 mM, or no more than about 0.5 mM. Combinations of the above-referenced concentrations of DIC species in the DIC-rich solution 116 are also possible (e.g., at least about 0.1 mM and no more than about 3 M or at least about 1 mM and no more than about 500 mM), inclusive of all values and ranges therebetween. In some embodiments, the DIC species can have a concentration in the DIC-rich solution 116 of about 0.1 mM, about 0.5 mM, about 1 mM, about 5 mM, about 10 mM, about 50 mM, about 100 mM, about 500 mM, or about 1 M, about 2 M, or about 3 M.

The exit stream 118 is an effluent stream from the $CO_2$ capture device 110. The $CO_2$ from the $CO_2$-containing stream 112 is either partially or completely removed in the $CO_2$ capture device 110 and the $CO_2$-containing stream 112 transforms into the exit stream 118 (i.e., the exit stream 118 is substantially the same as the $CO_2$-containing stream 112 without the removed $CO_2$). In some embodiments, the exit stream 118 can be a gas stream. In some embodiments, the exit stream 118 can be a liquid stream. In some embodiments, the exit stream 118 can include liquid and gas. In some embodiments, the exit stream 118 can include dissolved solids. The total flow rate of $CO_2$ exiting the $CO_2$ capture device 110 is less than the total flow rate of $CO_2$ entering the $CO_2$ capture device 110.

In some embodiments, the exit stream 118 can have a $CO_2$ concentration of no more than about 100 vol %, no more than about 95 vol %, no more than about 90 vol %, no more than about 80 vol %, no more than about 70 vol %, no more than about 60 vol %, no more than about 50 vol %, no more than about 40 vol %, no more than about 30 vol %, no more than about 20 vol %, no more than about 10 vol %, no more than about 5 vol %, no more than about 1 vol %, no more than about 0.5 vol %, no more than about 0.1 vol %, no more than about 900 ppm, no more than about 800 ppm, no more than about 700 ppm, no more than about 600 ppm, no more than about 500 ppm, no more than about 400 ppm, no more than about 300 ppm, no more than about 200 ppm, no more than about 100 ppm, no more than about 50 ppm, no more than about 10 ppm, no more than about 5 ppm, or no more than about 1 ppm, inclusive of all values and ranges therebetween. In some embodiments, the exit stream 118 can be free or substantially free of $CO_2$.

In some embodiments, the water stream 119 delivers make-up water to the system 100. This make-up water can replenish water to the system 100 that is split in the electrolyzer 120. As shown, the water stream 119 is fluidically coupled to the $CO_2$ capture device 110. In some embodiments, the water stream 119 can be fluidically coupled to the electrolyzer 120. In some embodiments, water can be removed from the system 100 when excess water is present in the system 100. In some embodiments, water vapor can be removed from the $CO_2$-containing stream 112.

In some embodiments, the water stream 119 can be subject to additional processing before delivering water to the system 100. In some embodiments, contaminants can be either partially removed or substantially removed from the water stream 119 prior to the delivery of water to the system 100. These contaminants can include chlorides, nitrates, sulfates, and any other undesirable components, includes such that may poison the electrode catalysts. The processing of the water stream 119 can ultimately yield greater purity levels in the production streams (i.e., the hydrogen stream, the oxygen stream, the $CO_2$ stream, and/or the carbonate stream). The additional processing can include reverse osmosis, filtration, membrane treatment, distillation, or any other suitable process or combination of processes.

In some embodiments, the flow rate of the alkaline solution 114, the DIC-rich solution 116 and/or the water stream 119 can be at least about 1 mL/min, at least about 5 mL/min, at least about 10 mL/min, at least about 50 mL/min, at least about 100 mL/min, at least about 200 mL/min, at least about 300 mL/min, at least about 400 mL/min, at least about 500 mL/min, at least about 600 mL/min, at least about 700 mL/min, at least about 800 mL/min, at least about 900 mL/min, at least about 1 L/min, at least about 5 L/min, at least about 10 L/min, at least about 50 L/min, at least about 100 L/min, at least about 200 L/min, at least about 300 L/min, at least about 400 L/min, at least about 500 L/min, at least about 600 L/min, at least about 700 L/min, at least about 800 L/min, at least about 900 L/min, or at least about 1 m³/min. In some embodiments, the flow rate of the alkaline solution 114, the DIC-rich solution 116 and/or the water stream 119 can be no more than about 1.1 m³/min, no more than about 1 m³/min, no more than about 900 L/min, no more than about 800 L/min, no more than about 700 L/min, no more than about 600 L/min, no more than about 500 L/min, no more than about 400 L/min, no more than about 300 L/min, no more than about 200 L/min, no more than about 100 L/min, no more than about 50 L/min, no more than about 10 L/min, no more than about 5 L/min, no more than about 1 L/min, no more than about 900 mL/min, no more than about 800 mL/min, no more than about 700 mL/min, no more than about 600 mL/min, no more than about 500 mL/min, no more than about 400 mL/min, no more than about 300 mL/min, no more than about 200 mL/min, no more than about 100 mL/min, no more than about 50 mL/min, no more than about 10 mL/min, or no more than about 5 mL/min. Combinations of the above-referenced flow rates of the alkaline solution 114, the DIC-rich solution 116 and/or the water stream 119 are also possible (e.g., at least about 1 mL/min and no more than about 1 L/min or at least about 10 mL/min and no more than about 500 mL/min), inclusive of all values and ranges therebetween. In some embodiments, the flow rate of the alkaline solution 114, the DIC-rich solution 116 and/or the water stream 119 can be about 1 mL/min, about 5 mL/min, about 10 mL/min, about 50 mL/min, about 100 mL/min, about 200 mL/min, about 300 mL/min, about 400 mL/min, about 500 mL/min, about 600 mL/min, about 700 mL/min, about 800 mL/min, about 900 mL/min, about 1 L/min, about 5 L/min, about 10 L/min, about 50 L/min, about 100 L/min, about 200 L/min, about 300 L/min, about 400 L/min, about 500 L/min, about 600 L/min, about 700 L/min, about 800 L/min, about 900 L/min, about 1 m³/min or about 1.1 m³/min.

The electrolyzer 120 defines a volume 121 that holds an electrolyte solution with a pH gradient. Regions of the volume 121 include a cathode region 130 with a cathode (not shown), an optional neutral region 140, and an anode region 150 with an anode (not shown). The electrolyzer 120 is fed by the DIC-rich solution 116, while the electrolyzer 120 expels the alkaline solution 114, a hydrogen stream 122, an oxygen stream 124, and a $CO_2$ stream 126. In some embodiments, the electrolyzer 120 can include an optional carbonate/bicarbonate stream 128.

The electrolyzer 120 performs a water-splitting electrolysis reaction while simultaneously converting the DIC-rich solution 116 back to the alkaline solution 114. The hydrogen stream 122, the oxygen stream 124, and the $CO_2$ stream 126 evolve from a water-splitting electrolysis reaction. In some embodiments, the hydrogen stream 122, the oxygen stream 124, and the $CO_2$ stream 126 all have high purity. The application of a current 111 to the electrolyzer 120 creates a pH gradient in the electrolyte, such that the cathode region 130 has an alkaline pH and the anode region 150 has an acidic pH.

In the electrolyzer 120, the cathode half-reaction (equation 2 below) takes place in the cathode region 130.

$$2H_2O(l) + 2e^- \rightleftharpoons 2OH^-(aq) + H_2(g) \quad (2)$$

In the electrolyzer 120, the anode half-reaction (equation 3 below) takes place in the anode region 150.

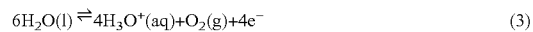

$$6H_2O(l) \rightleftharpoons 4H_3O^+(aq) + O_2(g) + 4e^- \quad (3)$$

In the electrolyzer 120, upon exposure to an increasingly acidic environment (i.e., as the DIC species approach the anode region 150), carbonates can become protonated to form bicarbonates, and bicarbonates can be protonated to form carbonic acid. Carbonic acid is typically unstable in an aqueous environment and decomposes to form water and $CO_2$. This transformation is described in the following chemical equations.

$$CO_3^{2-}(aq)+H_3O^+(aq) \rightleftharpoons HCO_3^-(aq)+H_2O(l) \quad (4)$$

$$HCO_3^-(aq)+H_3O^+(aq) \rightleftharpoons H_2CO_3(aq)+H_2O(l) \quad (5)$$

$$H_2CO_3(aq) \rightleftharpoons CO_2(g)+H_2O(l) \quad (6)$$

In some embodiments, the electrolyzer 120 can include $Na^+$ as a dominant cation (i.e., a cation with an average molar concentration in the electrolyzer 120 higher than an average molar concentration of any other cation). In some embodiments, the electrolyzer 120 can include $K^+$ as a dominant cation. In some embodiments, the electrolyzer 120 can include any ionized alkali metal as a dominant cation. In some embodiments, the electrolyzer 120 can include any ionized alkaline earth metal as a dominant cation.

In some embodiments, the electrolyzer 120 can have a volume of at least about 1 L, at least about 5 L, at least about 10 L, at least about 20 L, at least about 30 L, at least about 40 L, at least about 50 L, at least about 60 L, at least about 70 L, at least about 80 L, at least about 90 L, at least about 100 L, at least about 500 L, at least about 1 m³, at least about 5 m³, at least about 10 m³, at least about 20 m³, at least about 30 m³, at least about 40 m³, at least about 50 m³, at least about 60 m³, at least about 70 m³, at least about 80 m³, or at least about 90 m³. In some embodiments, the electrolyzer 120 can have a volume of no more than about 100 m³, no more than about 90 m³, no more than about no more than about 80 m³, no more than about 70 m³, no more than about 60 m³, no more than about 50 m³, no more than about 40 m³, no more than about 30 m³, no more than about 20 m³, no more than about 10 m³, no more than about 5 m³, no more than about 1 m³, no more than about 500 L, no more than about 100 L, no more than about 90 L, no more than about 80 L, no more than about 70 L, no more than about 60 L, no more than about 50 L, no more than about 40 L, no more than about 30 L, no more than about 20 L, no more than about 10 L, or no more than about 5 L. Combinations of the above-referenced volumes of the electrolyzer 120 are also possible (e.g., at least about 1 L and no more than about 100 m³ or at least about 5 L and no more than about 10 L), inclusive of all values and ranges therebetween. In some embodiments, the electrolyzer 120 can have a volume of about 1 L, about 5 L, about 10 L, about 20 L, about 30 L, about 40 L, about 50 L, about 60 L, about 70 L, about 80 L, about 90 L, about 100 L, about 500 L, about 1 m³ about 5 m³ about 10 m³ about 20 m³ about 30 m³ about 40 m³ about 50 m³ about 60 m³ about 70 m³ about 80 m³ about 90 m³ or about 100 m³.

In some embodiments, the current applied to the electrolyzer 120 can result in a current density in the electrolyzer 120 of at least about 0.1 A/cm², at least about 0.2 A/cm², at least about 0.3 A/cm², at least about 0.4 A/cm², at least about 0.5 A/cm², at least about 0.6 A/cm², at least about 0.7 A/cm², at least about 0.8 A/cm², at least about 0.9 A/cm², at least about 1 A/cm², at least about 2 A/cm², at least about 3 A/cm², or at least about 4 A/cm². In some embodiments, the current applied to the electrolyzer 120 can result in a current density in the electrolyzer 120 of no more than about 5 A/cm², no more than about 4 A/cm², no more than about 3 A/cm², no more than about 2 A/cm², no more than about 1 A/cm², no more than about 0.9 A/cm², no more than about 0.8 A/cm², no more than about 0.7 A/cm², no more than about 0.6 A/cm², no more than about 0.5 A/cm², no more than about 0.4 A/cm², no more than about 0.3 A/cm², or no more than about 0.2 A/cm². Combinations of the above-referenced current densities in the electrolyzer 120 resulting from the current applied to the electrolyzer 120 are also possible (e.g., at least about 0.1 A/cm² and no more than about 5 A/cm² or at least about 0.5 A/cm² and no more than about 3 A/cm²), inclusive of all values and ranges therebetween. In some embodiments, the current applied to the electrolyzer 120 can result in a current density in the electrolyzer 120 of about 0.1 A/cm², about 0.2 A/cm², about 0.3 A/cm², about 0.4 A/cm², about 0.5 A/cm², about 0.6 A/cm², about 0.7 A/cm², about 0.8 A/cm², about 0.9 A/cm², about 1 A/cm², about 2 A/cm², about 3 A/cm², about 4 A/cm², or about 5 A/cm².

In some embodiments, the electrolyzer 120 can be operated at a temperature of at least about 0° C., at least about 10° C., at least about 20° C., at least about 30° C., at least about 40° C., at least about 50° C., at least about 60° C., at least about 70° C., at least about 80° C., at least about 90° C., at least about 100° C., at least about 150° C., at least about 200° C., at least about 250° C., or at least about 300° C. In some embodiments, the electrolyzer 120 can be operated at a temperature of no more than about 350° C., no more than about 300° C., no more than about 250° C., no more than about 200° C., no more than about 150° C., no more than about 100° C., no more than about 90° C., no more than about 80° C., no more than about 70° C., no more than about 60° C., no more than about 50° C., no more than about 40° C., no more than about 30° C., no more than about 20° C., no more than about 10° C. Combinations of the above-referenced operating temperatures of the electrolyzer 120 are also possible (e.g., at least about 0° C. and no more than about 350° C. or at least about 20° C. and no more than about 40° C.), inclusive of all values and ranges therebetween. In some embodiments, the electrolyzer 120 can be operated at a temperature of about 0° C., about 10° C., about 20° C., about 30° C., about 40° C., about 50° C., about 60° C., about 70° C., about 80° C., about 90° C., about 100° C., about 150° C., about 200° C., about 250° C., about 300° C., or about 350° C.

According to various embodiments, the electrolyzer 120 may be disposed inside a pressurized housing 123, allowing the electrolyzer 120 to operate under non-atmospheric pressures. In some embodiments, the electrolyzer 120 can be operated at an absolute pressure of at least about 0.1 bar, at least about 0.5 bar, at least about 0.75 bar at least about 1 bar, at least about 2 bar, at least about 3 bar, at least about 4 bar, at least about 5 bar, at least about 10 bar, at least about 20 bar, at least about 30 bar, at least about 40 bar, at least about 50 bar, at least about 60 bar, at least about 70 bar, at least about 80 bar, or at least about 90 bar. In some embodiments, the electrolyzer 120 can be operated at an absolute pressure of no more than about 100 bar, no more than about 90 bar, no more than about 80 bar, no more than about 70 bar, no more than about 60 bar, no more than about 50 bar, no more than about 40 bar, no more than about 30 bar, no more than about 20 bar, no more than about 10 bar, no more than about 5 bar, no more than about 4 bar, no more than about 3 bar, no more than about 2 bar, no more than about 1 bar, no more than about 0.75 bar or no more than about 0.5 bar. Combinations of the above-referenced operating pressures of the electrolyzer 120 are also possible (e.g., at least about 0.1 bar and less than about 100 bar or at least about 10 bar and less than about 50 bar), inclusive of all values and ranges therebetween. In some embodiments, the electrolyzer 120 can be operated at an absolute pressure of about 0.1 bar, about 0.5 bar, about 0.75 bar 1 bar, about 2 bar, about 3 bar, about 4 bar, about 5 bar, about 10 bar, about 20 bar, about 30 bar, about 40 bar, about 50 bar, about 60 bar, about 70 bar, about 80 bar, about 90 bar, or about 100 bar. In some embodiments, the pressure in the electrolyzer 120 can be varied during operation. In some embodiments, the electrolyzer 120 can be in fluid communication with an external storage tank (not shown).

In some embodiments, the electrolyzer 120 can have a gas output absolute pressure of at least about 0.1 bar, at least about 0.5 bar, at least about 0.75 bar, at least about 1 bar, at least about 2 bar, at least about 3 bar, at least about 4 bar, at least about 5 bar, at least about 10 bar, at least about 20 bar, at least about 30 bar, at least about 40 bar, at least about 50 bar, at least about 60 bar, at least about 70 bar, at least about 80 bar, or at least about 90 bar. In some embodiments, the electrolyzer 120 can have a gas output absolute pressure of no more than about 100 bar, no more than about 90 bar, no more than about 80 bar, no more than about 70 bar, no more than about 60 bar, no more than about 50 bar, no more than about 40 bar, no more than about 30 bar, no more than about 20 bar, no more than about 10 bar, no more than about 5 bar, no more than about 4 bar, no more than about 3 bar, no more than about 2 bar, no more than about 1 bar, no more than about 0.75 bar, or no more than about 0.5 bar. Combinations of the above-referenced gas output absolute pressures from the electrolyzer 120 are also possible (e.g., at least about 0.1 bar and no more than about 100 bar or at least about 10 bar and no more than about 50 bar), inclusive of all values and ranges therebetween. In some embodiments, the electrolyzer 120 can have a gas output absolute pressure of about 0.1 bar, about 0.5 bar, about 0.75 bar, about 1 bar, about 2 bar, about 3 bar, about 4 bar, about 5 bar, about 10 bar, about 20 bar, about 30 bar, about 40 bar, about 50 bar, about 60 bar, about 70 bar, about 80 bar, about 90 bar, or about 100 bar.

In some embodiments, the electrolyzer 120 can be embedded into a pressure chamber (not shown), wherein the pressure chamber sets the output pressure of the gas streams while limiting pressure differences across the electrolyzer 120 to pressure differences needed to maintain desired fluid flow rates.

In some embodiments, the hydrogen stream 122 can include at least about 90 vol %, at least about 95 vol %, at least about 96 vol %, at least about 97 vol %, at least about 98 vol %, at least about 99 vol %, at least about 99.5 vol %, at least about 99.9 vol %, at least about 99.95 vol %, at least about 99.99 vol %, or about 100 vol % hydrogen, inclusive of all values and ranges therebetween. In some embodiments, the oxygen stream 124 can include at least about 90 vol %, at least about 95 vol %, at least about 96 vol %, at least about 97 vol %, at least about 98 vol %, at least about 99 vol %, at least about 99.5 vol %, at least about 99.9 vol %, at least about 99.95 vol %, at least about 99.99 vol %, or about 100 vol % oxygen, inclusive of all values and ranges therebetween. In some embodiments, the $CO_2$ stream 126 can include at least about 90 vol %, at least about 95 vol %, at least about 96 vol %, at least about 97 vol %, at least about 98 vol %, at least about 99 vol %, at least about 99.5 vol %, at least about 99.9 vol %, at least about 99.95 vol %, at least about 99.99 vol %, or about 100 vol % $CO_2$, inclusive of all values and ranges therebetween.

In some embodiments, the hydrogen stream 122 and the $CO_2$ stream 126 can exit the electrolyzer 120 together as a single gas stream. In some embodiments, the hydrogen stream 122 can have a mol:mol ratio with the $CO_2$ stream 126 of at least about 1:2, at least about 1:1, at least about 2:1, at least about 3:1, at least about 4:1, at least about 5:1, at least about 6:1, at least about 7:1, at least about 8:1, or at least about 9:1. In some embodiments, the hydrogen stream 122 can have a mol:mol ratio with the $CO_2$ stream 126 of no more than about 10:1, no more than about 9:1, no more than about 8:1, no more than about 7:1, no more than about 6:1, no more than about 5:1, no more than about 4:1, no more than about 3:1, no more than about 2:1, or no more than about 1:1. Combinations of the above-referenced ranges for the mol:mol ratio of the hydrogen stream 122 to the $CO_2$ stream 126 are also possible (e.g., at least about 1:2 and no more than about 10:1 or at least about 1:1 and no more than about 3:1). In some embodiments, the hydrogen stream 122 can have a mol:mol ratio with the $CO_2$ stream 126 of about 1:2, about 1:1, about 2:1, about 3:1, about 4:1, about 5:1, about 6:1, about 7:1, about 8:1, about 9:1, or about 10:1.

In some embodiments, the hydrogen stream 122, the oxygen stream 124, and/or the $CO_2$ stream 126 can have a flow rate of at least about 0.1 mmol/s, at least about 0.5 mmol/s, at least about 1 mmol/s, at least about 2 mmol/s, at least about 3 mmol/s, at least about 4 mmol/s, at least about 4 mmol/s, at least about 6 mmol/s, at least about 7 mmol/s, at least about 8 mmol/s, at least about 9 mmol/s, at least about 10 mmol/s, at least about 11 mmol/s, at least about 12 mmol/s, at least about 13 mmol/s, at least about 14 mmol/s, at least about 15 mmol/s, at least about 16 mmol/s, at least about 17 mmol/s, at least about 18 mmol/s, at least about 19 mmol/s, at least about 20 mmol/s, at least about 50 mmol/s, at least about 100 mmol/s, at least about 500 mmol/s, at least about 1 mol/s, at least about 2 mol/s, at least about 3 mol/s, at least about 4 mol/s, at least about 5 mol/s, at least about 6 mol/s, at least about 7 mol/s, at least about 8 mol/s, or at least about 9 mol/s. In some embodiments, the hydrogen stream 122, the oxygen stream 124, and/or the $CO_2$ stream 126 can have a flow rate of no more than about 10 mol/s, no more than about 9 mol/s, no more than about 8 mol/s, no more than about 7 mol/s, no more than about 6 mol/s, no more than about 5 mol/s, no more than about 4 mol/s, no more than about 3 mol/s, no more than about 2 mol/s, no more than about 1 mol/s, no more than about 500 mmol/s, no more than about 100 mmol/s, no more than about 50 mmol/s, 20 mmol/s, no more than about 19 mmol/s, no more than about 18 mmol/s, no more than about 17 mmol/s, no more than about 16 mmol/s, no more than about 15 mmol/s, no more than about 14 mmol/s, no more than about 13 mmol/s, no more than about 12 mmol/s, no more than about 11 mmol/s, no more than about 10 mmol/s, no more than about 9 mmol/s, no more than about 8 mmol/s, no more than about 7 mmol/s, no more than about 6 mmol/s, no more than about 5 mmol/s, no more than about 4 mmol/s, no more than about 3 mmol/s, no more than about 2 mmol/s, no more than about 1 mmol/s, or no more than about 0.5 mmol/s. Combinations of the above-referenced flow rates of the hydrogen stream 122, the oxygen stream 124, and/or the $CO_2$ stream 126 are also possible (e.g., at least about 0.1 mmol/s and no more than about 10 mol/s or at least about 5 mmol/s and no more than about 15 mmol/s), inclusive of all values and ranges therebetween. In some embodiments, the hydrogen stream 122, the oxygen stream 124, and/or the $CO_2$ stream 126 can have a flow rate of about 0.1 mmol/s, about 0.5 mmol/s, about 1 mmol/s, about 2 mmol/s, about 3 mmol/s, about 4 mmol/s, about 5 mmol/s, about 6 mmol/s, about 7 mmol/s, about 8 mmol/s, about 9 mmol/s, about 10 mmol/s, about 11 mmol/s, about 12 mmol/s, about 13 mmol/s, about 14 mmol/s, about 15 mmol/s, about 16 mmol/s, about 17 mmol/s, about 18 mmol/s, about 19 mmol/s, about 20 mmol/s, about 50 mmol/s, about 100 mmol/s, about 500 mmol/s, about 1 mol/s, about 2 mol/s, about 3 mol/s, about 4 mol/s, about 5 mol/s, about 6 mol/s, about 7 mol/s, about 8 mol/s, about 9 mol/s, or about 10 mol/s.

In some embodiments, electrolyte can be removed from the electrolyzer 120 while still containing carbonates and/or bicarbonates via the carbonate/bicarbonate stream 128. This can be accomplished by removing electrolyte at a point along the length of the electrolyzer 120, where the pH is not low enough to fully convert the carbonates and/or bicarbonates to carbonic acid and $CO_2$. Depending on where in the electrolyzer 120 the carbonate/bicarbonate stream 128 is removed, the carbonate/bicarbonate stream 128 can be more or less acidic than the DIC-rich solution 116. In some embodiments, the carbonate/bicarbonate stream 128 can exit the electrolyzer 120 as an acidified solution, but not to the point that $CO_2$ gas would be released. In some embodiments, the carbonate/bicarbonate stream 128, once withdrawn, can then be processed further to regenerate the alkaline solution 114. In some embodiments, carbonate salts and/or bicarbonate salts can be precipitated out of the carbonate/bicarbonate stream 128 by cooling the carbonate/bicarbonate stream 128 outside of the electrolyzer 120. In some embodiments, the carbonate salts and/or bicarbonate salts can be calcined to produce $CO_2$ and water vapor. In some embodiments, a thermal decomposition can be performed to convert the bicarbonates into carbonates. In some embodiments, the carbonate/bicarbonate stream 128 can be fluidically coupled to the neutral region 140. In some embodiments, the carbonate/bicarbonate stream 128 can outgas $CO_2$. In some embodiments, excess water can be removed from the electrolyzer 120. In some embodiments, excess water can be removed from the electrolyzer 120 via the carbonate/bicarbonate stream 128. In some embodiments, excess water can be removed from the electrolyzer 120 via an osmotic membrane. In some embodiments, excess water can be removed from the electrolyzer 120 by evaporation from circulating the electrolyte.

Figure 2:
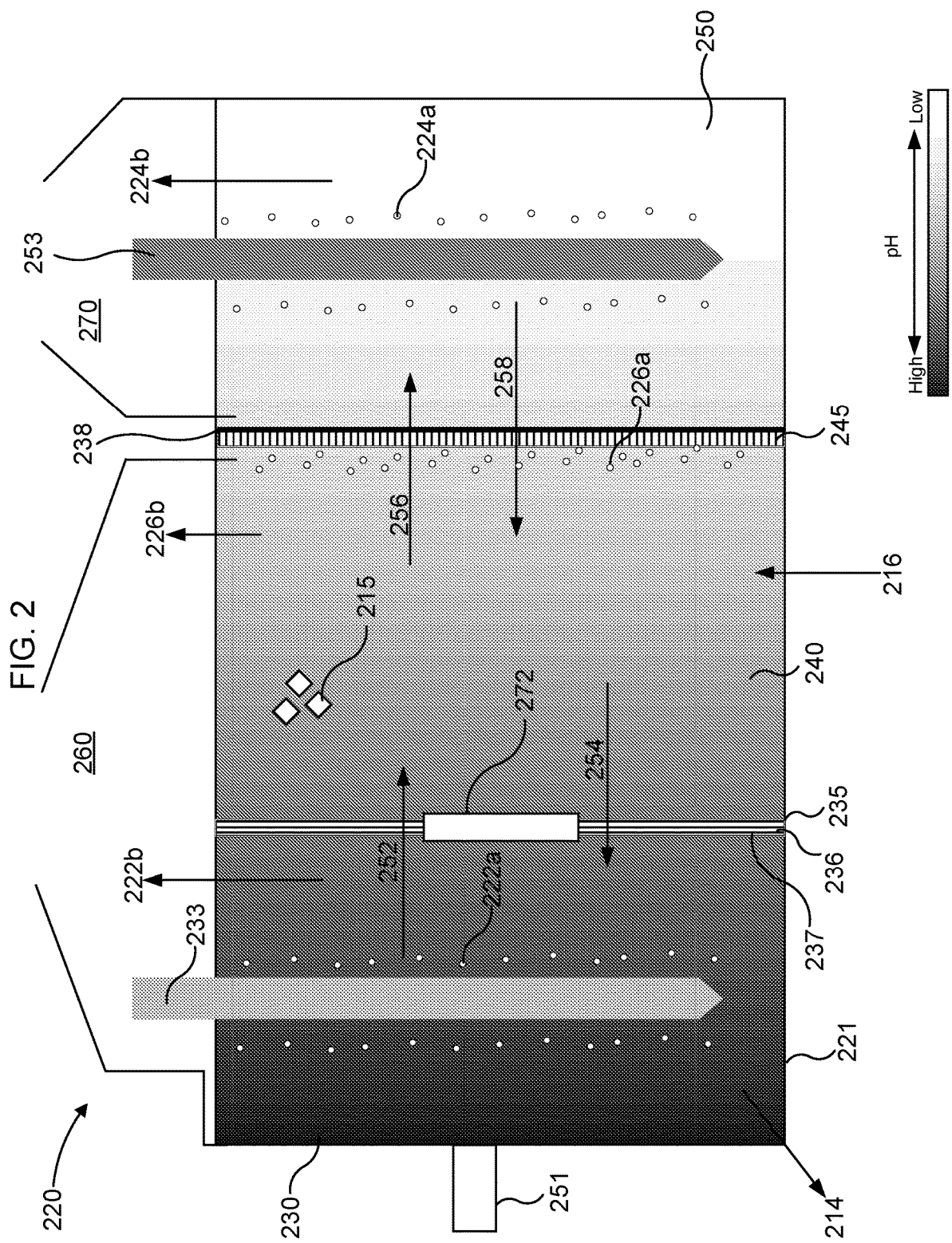
FIG. 2 shows an electrolyzer that can be incorporated in a system for production of synthetic fuel through $CO_2$ capture and water splitting, according to an embodiment.

FIG. 2 is an electrolyzer 220 that can be incorporated in a system for production of synthetic fuel through $CO_2$ capture and water splitting, according to an embodiment. In some embodiments, the electrolyzer 220 can be fluidically coupled to a $CO_2$ capture device (not shown). An alkaline solution 214 is expelled from the electrolyzer 220, while the electrolyzer 220 is fed by a DIC-rich solution 216. Hydrogen bubbles 222a, oxygen bubbles 224a, and $CO_2$ bubbles 226a form in the electrolyzer 220 and exit the electrolyzer as a hydrogen stream 222b, an oxygen stream 224b, and a $CO_2$ stream 226b, respectively. The electrolyzer 220 defines a volume 221 that includes a cathode region 230 with a cathode 233, a neutral region 240, and an anode region 250 with an anode 253. In some embodiments, the electrolyzer 220 can include a cathodic headspace 260 and an anodic headspace 270. In some embodiments, the electrolyzer 220 can include a cathodic divider 235 between the cathode region 230 and the neutral region 240. In some embodiments, the electrolyzer 220 can include an anodic divider 245 between the neutral region 240 and the anodic region 250. In some embodiments, the electrolyzer 220 can be without any dividers between the cathode region 230 and the neutral region 240 or between the neutral region 240 and the anode region 250. Electrochemical gradients in the electrolyzer 220 can cause migration of ionic species. Ionic flow path 252 represents flow of ionic species from the cathode region 230 to the neutral region 240. Ionic flow path 254 represents flow of ionic species from the neutral region 240 to the cathode region 230. Ionic flow path 256 represents flow of ionic species from the neutral region 240 to the anode region 250. Ionic flow path 258 represents flow of ionic species from the anode region 250 to the neutral region 240.

In some embodiments, the electrolyzer 220, the cathode region 230, the neutral region 240, the anode region 250, the alkaline solution 214, the DIC-rich solution 216, the hydrogen stream 222b, the oxygen stream 224b, and/or the $CO_2$ stream 226b can be the same or substantially similar to the electrolyzer 120, the cathode region 130, the neutral region 140, the anode region 150, the alkaline solution 114, the DIC-rich solution 116, the hydrogen stream 122, the oxygen stream 124, and/or the $CO_2$ stream 126, respectively, as described above with reference to FIG. 1.

The net movement of fluid within the electrolyzer 220 is from the side of the electrolyzer 220 with the anode region 250 to the side of the electrolyzer with the cathode region 230. In some embodiments, the net movement of fluid within the electrolyzer 220 can have an average velocity of at least about 0.001 mm/s, at least about 0.005 mm/s, at least about 0.01 mm/s, at least about 0.05 mm/s, at least about 0.1 mm/s, at least about 0.5 mm/s, at least about 1 mm/s, at least about 2 mm/s, at least about 3 mm/s, at least about 4 mm/s, at least about 5 mm/s, at least about 6 mm/s, at least about 7 mm/s, at least about 8 mm/s, at least about 9 mm/s, at least about 1 cm/s, at least about 2 cm/s, at least about 3 cm/s, at least about 4 cm/s, at least about 5 cm/s, at least about 6 cm/s, at least about 7 cm/s, at least about 8 cm/s, or at least about 9 cm/s. In some embodiments, the net movement of fluid within the electrolyzer 220 can have an average velocity of no more than about 10 cm/s, no more than about 9 cm/s, no more than about 8 cm/s, no more than about 7 cm/s, no more than about 6 cm/s, no more than about 5 cm/s, no more than about 4 cm/s, no more than about 3 cm/s, no more than about 2 cm/s, no more than about 1 cm/s, no more than about 9 mm/s, no more than about 8 mm/s, no more than about 7 mm/s, no more than about 6 mm/s, no more than about 5 mm/s, no more than about 4 mm/s, no more than about 3 mm/s, no more than about 2 mm/s, no more than about 1 mm/s, no more than about 0.5 mm/s, no more than about 0.1 mm/s, no more than about 0.05 mm/s, no more than about 0.01 mm/s, or no more than about 0.005 mm/s. Combination of the above-referenced ranges for the net movement of fluid within the electrolyzer 220 are also possible (e.g., greater than about 0.001 mm/s and no more than about 10 cm/s or greater than about 1 mm/s and no more than about 5 mm/s), inclusive of all values and ranges therebetween. In some embodiments, the net movement of fluid within the electrolyzer 220 can have an average velocity of about 0.001 mm/s, about 0.005 mm/s, about 0.01 mm/s, about 0.05 mm/s, about 0.1 mm/s, about 0.5 mm/s, about 1 mm/s, about 2 mm/s, about 3 mm/s, about 4 mm/s, about 5 mm/s, about 6 mm/s, about 7 mm/s, about 8 mm/s, about 9 mm/s, about 1 cm/s, about 2 cm/s, about 3 cm/s, about 4 cm/s, about 5 cm/s, about 6 cm/s, about 7 cm/s, about 8 cm/s, about 9 cm/s, or about 10 cm/s. In some embodiments, separate circulation could be employed in the cathode region 230, the neutral region 240, and/or the anode region 250 to enable mixing within the cathode region 230, the neutral region 240, and/or the anode region 250 to reduce internal concentration gradients.

In some embodiments, the current applied to the electrolyzer 220 can result in a current density of at least about 10 $mA/cm^2$, at least about 20 $mA/cm^2$, at least about 30 $mA/cm^2$, at least about 40 $mA/cm^2$, at least about 50 $mA/cm^2$, at least about 60 $mA/cm^2$, at least about 70 $mA/cm^2$, at least about 80 $mA/cm^2$, at least about 90 $mA/cm^2$, at least about 0.1 $A/cm^2$, at least about 0.2 $A/cm^2$, at least about 0.3 $A/cm^2$, at least about 0.4 $A/cm^2$, at least about 0.5 $A/cm^2$, at least about 0.6 $A/cm^2$, at least about 0.7 $A/cm^2$, at least about 0.8 $A/cm^2$, at least about 0.9 $A/cm^2$, at least about 1 A/cm$^2$, at least about 2 A/cm$^2$, at least about 3 A/cm$^2$, or at least about 4 A/cm$^2$. In some embodiments, the current applied to the electrolyzer 220 can result in a current density of no more than about 5 A/cm$^2$, no more than about 4 A/cm$^2$, no more than about 3 A/cm$^2$, no more than about 2 A/cm$^2$, no more than about 1 A/cm$^2$, no more than about 0.9 A/cm$^2$, no more than about 0.8 A/cm$^2$, no more than about 0.7 A/cm$^2$, no more than about 0.6 A/cm$^2$, no more than about 0.5 A/cm$^2$, no more than about 0.4 A/cm$^2$, no more than about 0.3 A/cm$^2$, no more than about 0.2 A/cm$^2$, no more than about 0.1 A cm$^2$, no more than about 90 mA/cm$^2$, no more than about 80 mA/cm$^2$, no more than about 70 mA/cm$^2$, no more than about 60 mA/cm$^2$, no more than about 50 mA/cm$^2$, no more than about 40 mA/cm$^2$, no more than about 30 mA/cm$^2$, or no more than about 20 mA/cm$^2$. Combinations of the above-referenced current densities resulting from the current applied to the electrolyzer 220 are also possible (e.g., at least about 0.1 A/cm$^2$ and no more than about 5 A/cm$^2$ or at least about 0.5 A/cm$^2$ and no more than about 3 A/cm$^2$), inclusive of all values and ranges therebetween. In some embodiments, the current applied to the electrolyzer 220 can result in a current density of about 10 mA/cm$^2$, about 20 mA/cm$^2$, about 30 mA/cm$^2$, about 40 mA/cm$^2$, about 50 mA/cm$^2$, about 60 mA/cm$^2$, about 70 mA/cm$^2$, about 80 mA/cm$^2$, about 90 mA/cm$^2$, about 0.1 A/cm$^2$, about 0.2 A/cm$^2$, about 0.3 A/cm$^2$, about 0.4 A/cm$^2$, about 0.5 A/cm$^2$, about 0.6 A/cm$^2$, about 0.7 A/cm$^2$, about 0.8 A/cm$^2$, about 0.9 A/cm$^2$, about 1 A/cm$^2$, about 2 A/cm$^2$, about 3 A/cm$^2$, about 4 A/cm$^2$, or about 5 A/cm$^2$.

As shown, the alkaline solution 214 leaves the electrolyzer 220 from the cathode region 230. In some embodiments, the alkaline solution 214 can leave the electrolyzer from the neutral region 240. As shown, the DIC-rich solution 216 enters the electrolyzer 220 via the neutral region 240. In some embodiments, the DIC-rich solution 216 can enter the electrolyzer 220 via the anode region 250. In some embodiments, the DIC-rich solution can enter the electrolyzer 220 at or near a boundary between the neutral region 240 and the anode region 250. In some embodiments, the DIC-rich solution 216 outgases $CO_2$ in the neutral region 240. In some embodiments, the DIC-rich solution 216 outgases $CO_2$ in the anode region 250.

In some embodiments, the DIC concentration in the DIC-rich solution 216 can be at least about 0.1 mM, at least about 0.5 mM, at least about 1 mM, at least about 5 mM, at least about 10 mM, at least about 50 mM, at least about 100 mM, at least about 500 mM, at least about 1 M, or at least about 2 M. In some embodiments, the DIC concentration in the DIC-rich solution 216 can be no more than about 3 M, no more than about 2 M, no more than about 1 M, no more than about 500 mM, no more than about 100 mM, no more than about 50 mM, no more than about 10 mM, no more than about 5 mM, no more than about 1 mM, or no more than about 0.5 mM. Combinations of the above-referenced DIC concentrations in the DIC-rich solution 216 are also possible (e.g., at least about 0.1 mM and no more than about 3 M or at least about 1 mM and no more than about 500 mM), inclusive of all values and ranges therebetween. In some embodiments, the DIC concentration in the DIC-rich solution 216 can be about 0.1 mM, about 0.5 mM, about 1 mM, about 5 mM, about 10 mM, about 50 mM, about 100 mM, about 500 mM, or about 1 M, about 2 M, or about 3 M.

The amount of product expelled from the electrolyzer 220 (i.e., the hydrogen stream 222b, the oxygen stream 224b, and the $CO_2$ stream 226b) is a function of the flow rate or velocity of fluid within the electrolyzer 220, the size of the pH gradient across the electrolyzer 220 (a function of the current density applied to the electrolyzer 220), the concentration of DIC in the DIC-rich solution 216, and the distance between the anode 253 and the cathode 233. In some embodiments, the hydrogen bubbles 222a can form in the cathode region 230 near the cathode 233 and exit the electrolyzer 220 as a hydrogen stream 222b. In some embodiments, the oxygen bubbles 224a can form in the anode region 250 near the anode 253 and exit the electrolyzer 220 as an oxygen stream 224b.

In some embodiments, the relative flow rate of the hydrogen stream 222b as compared to the $CO_2$ stream 226b can be controlled by modifying the velocity of fluid within the electrolyzer 220, the current density applied to the electrolyzer 220, the concentration of DIC in the DIC-rich solution 216, and the distance between the anode 230 and the cathode 250. In some embodiments, the relative flow rate of the oxygen stream 224b as compared to the $CO_2$ stream 226b can be controlled by modifying the velocity of fluid within the electrolyzer 220, the current density applied to the electrolyzer 220, the concentration of DIC in the DIC-rich solution 216, and the distance between the anode 230 and the cathode 250.

In some embodiments, the hydrogen bubbles 222a can form on the surface of the cathode 233 and migrate to exit the electrolyzer 220 as the hydrogen stream 222b. In some embodiments, the oxygen bubbles 224a can form on the surface of the anode 253 and migrate to exit the electrolyzer 220 as the oxygen stream 224b. In some embodiments, a partition (not shown) can be placed between the hydrogen stream 222b, and the $CO_2$ stream 226b to keep the flow paths of these streams separate from one another. In some embodiments, a partition (not shown) can be placed between the oxygen stream 224b and the hydrogen stream 222b to keep the flow paths of these streams separate from one another. In some embodiments, the hydrogen stream 222b and the $CO_2$ stream 226b are allowed to mix for further processing. In some embodiments, the hydrogen stream 222b and the $CO_2$ stream 226b can mix at the point of production. In some embodiments, the $CO_2$ bubbles 226a can form in the neutral region 240. In some embodiments, the $CO_2$ bubbles 226a can form on the surface of the anodic divider 245. After formation, the $CO_2$ bubbles 226a migrate to exit the electrolyzer 220 as the $CO_2$ stream 226b.

As described above, the cathode region 230 includes the cathode 233. In some embodiments, the cathode 233 can be composed of nickel, platinum, or any other suitable cathode material. In some embodiments, the cathode region 230 can be in fluid communication with the alkaline solution 214. In some embodiments, the cathode region 230 can be fluidically coupled to the $CO_2$ capture device via a conduit 251 that transports the alkaline solution 214 from the cathode region 230 to the $CO_2$ capture device. In some embodiments, the cathode region 230 can have a pH of at least about 7, at least about 7.5, at least about 8, at least about 8.5, at least about 9, at least about 9.5, at least about 10, at least about 10.5, at least about 11, at least about 11.5, at least about 12, at least about 12.5, at least about 13, or at least about 13.5. In some embodiments, the cathode region 230 can have a pH of no more than about 14, no more than about 13.5, no more than about 13, no more than about 12.5, no more than about 12, no more than about 11.5, no more than about 11, no more than about 10.5, no more than about 10, no more than about 9.5, no more than about 9, no more than about 8.5, no more than about 8, or no more than about 7.5. Combinations of the above-referenced pH values in the cathode region 230 are also possible (e.g., at least about 7 and no more than about 14 or at least about 9 and no more than about 13), inclusive of all values and ranges therebetween. In some embodiments, the cathode region 230 can have a pH of about 7, about 7.5, about 8, about 8.5, about 9.5, about 10, about 10.5, about 11, about 11.5, about 12, about 12.5, about 13, about 13.5, or about 14.

As described above, the neutral region 240 is adjacent to the cathode region 230. In some embodiments, the neutral region 240 can be in fluid communication with the alkaline solution 214. In some embodiments, the neutral region 240 can be fluidically coupled to the $CO_2$ capture device via a conduit that transports the alkaline solution 214 from the neutral region 240 to the $CO_2$ capture device. In some embodiments, the neutral region 240 can have a pH of at least about 6, at least about 6.5, at least about 7, at least about 7.5, at least about 8, at least about 8.5, at least about 9, at least about 9.5, at least about 10, at least about 10.5, at least about 11, at least about 11.5, at least about 12, at least about 12.5, at least about 13, or at least about 13.5. In some embodiments, the neutral region 140 can have a pH of no more than about 14, no more than about 13.5, no more than about 13, no more than about 12.5, no more than about 12, no more than about 11.5, no more than about 11, no more than about 10.5, no more than about 10, no more than about 9.5, no more than about 9, no more than about 8.5, no more than about 8, no more than about 7.5, no more than about 7, or no more than about 6.5. Combinations of the above-referenced pH values in the neutral region 240 are also possible (e.g., at least about 6 and no more than about 14 or at least about 8 and no more than about 13), inclusive of all values and ranges therebetween. In some embodiments, the neutral region 240 can have a pH of about 6, about 6.5, about 7, about 7.5, about 8, about 8.5, about 9.5, about 10, about 10.5, about 11, about 11.5, about 12, about 12.5, about 13, about 13.5, or about 14.

As described above, the anode region 250 includes the anode 253. In some embodiments, the anode 253 can be composed of nickel oxide, nickel oxide mixed with membrane material, or any other suitable anode material. In some embodiments, an anolyte (e.g., sulfuric acid) can be circulated through the anode region 250 and transport dissolved $CO_2$ outside of the electrolyzer 220 where the $CO_2$ can be outgassed. In some embodiments, the counter-ions in the anode region 250 (i.e., anolyte ions) can include sulfates, sulfites, phosphates, nitrates, or any other suitable anion that creates an acid when protonated. In other words, the anode region 250 can be populated with a sulfuric acid anolyte, a sulfurous acid anolyte, a phosphoric acid anolyte, a nitric acid anolyte, or any other suitable acid anolyte.

In some embodiments, the anode region 250 can have a pH of at least about 1, at least about 1.5, at least about 2, at least about 2.5, at least about 3, at least about 3.5, at least about 4, at least about 4.5, at least about 5, at least about 5.5, at least about 6, or at least about 6.5. In some embodiments, the anode region 250 can have a pH of no more than about 7, no more than about 6.5, no more than about 6, no more than about 5.5, no more than about 5, no more than about 4.5, no more than about 4, no more than about 3.5, no more than about 3, no more than about 2.5, no more than about 2, or no more than about 1.5. Combinations of the above-referenced pH values in the anode region 250 are also possible (e.g., at least about 1 and no more than about 7 or at least about 2 and no more than about 4), inclusive of all values and ranges therebetween. In some embodiments, the anode region 250 can have a pH of about 1, about 1.5, about 2, about 2.5, about 3, about 3.5, about 4, about 4.5, about 5, about 5.5, about 6, about 6.5, or about 7.

In some embodiments, the distance between the cathode 233 and the anode 253 can be at least about 0.2 mm, at least about 0.4 mm, at least about 0.6 mm, at least about 0.8 mm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the distance between the cathode 233 and the anode 253 can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 0.8 mm, no more than about 0.6 mm, or no more than about 0.4 mm. Combinations of the above-referenced distances between the cathode 233 and the anode 253 are also possible (e.g., at least about 0.2 mm and no more than about 5 cm or at least about 1 mm and no more than about 1 cm), inclusive of all values and ranges therebetween. In some embodiments, the distance between the cathode 233 and the anode 253 can be about 0.2 mm, about 0.4 mm, about 0.6 mm, about 0.8 mm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm.

In some embodiments, the cathodic divider 235 can separate the cathode region 230 from the neutral region 240. In some embodiments, the anodic divider 245 can separate the neutral region from the anode region 250. The divider or dividers prevent electroactive species from mixing with one another. For example, if the anode region 250 is populated with a sulfuric acid anolyte, the cathodic divider 235 and/or the anodic divider 245 can prevent sulfate ions from entering the cathode region 230 and they can prevent hydroxide ions from entering the anode region 250. This separation is important, as cross-mixing of these species can compromise the pH gradient across the length of the electrolyzer 220, and therefore, the operational efficiency of the electrolyzer 220.

The use of multiple dividers can more effectively prevent the anolyte ions from exiting the anode region 250 and more effectively prevent the hydroxide ions evolved from the cathode half-reaction in the cathode region 230 from flowing back into the neutral region 240. In some embodiments, the anodic divider 245 can pass protons from the anode region 250 to the neutral region 240 to acidify the electrolyte in the neutral region 240 and thus lead to the evolution of the $CO_2$ bubbles 222a. In some embodiments, the cathodic divider 235 and/or the anodic divider 245 can include porous membrane, mesh material, porous material, or other obstacles that prevent fluid circulation across the cathodic divider 235 and/or the anodic divider 245 without stopping electronic ionic currents from crossing the cathodic divider 235 and/or the anodic divider 245. In some embodiments, the cathodic divider 235 and/or the anodic divider 245 can include a cationic membrane 238 that prevents fluid flow and the flow of anions. In some embodiments, the cathodic divider 235 and/or the anodic divider 245 can include a material 236 having multiple layers 237. In some embodiments, the cathodic divider 235 and/or the anodic divider 245 can include any combination of the above-referenced types of dividers. In some embodiments, the cathodic divider 235 and/or the anodic divider 245 can include a flow straightener 272 that establishes a horizontal flow and prevents back mixing. In some embodiments, the flow straightener 272 can be a rigid honeycomb structure, a rectangular pattern, or any other uniform structure.

The ionic flow path 252 represents the flow of ionic species from the cathode region 230 to the neutral region 240. In some embodiments, the ionic flow path 252 can flow through the cathodic divider 235. In some embodiments, the ionic flow path 252 can include hydroxide ions, carbonate ions, bicarbonate ions, or any combination of suitable ionic species. The ionic flow path 254 represents the flow of ionic species from the neutral region 240 to the cathode region 230. In some embodiments, the ionic flow path 254 can flow through the cathodic divider 245. In some embodiments, the ionic flow path 254 can include sodium ions, potassium ions, calcium ions, magnesium ions, any alkali metals, any alkaline earth metals, or any other cations or combination of cations suitable for the transfer of charge. The ionic flow path 256 represents the flow of ionic species from the neutral region 240 to the anode region 250. In some embodiments, the ionic flow path 256 can flow through the anodic divider 245. In some embodiments, the ionic flow path 256 can include carbonate ions, bicarbonate ions, or any combination thereof. The ionic flow path 258 represents the flow of ionic species from the anode region 250 to the neutral region 240. In some embodiments, the ionic flow path 258 can flow through the anodic divider 245. In some embodiments, the ionic flow path 258 can include hydronium ions or any other suitable cation for the transfer of charge.

In some embodiments, the cathodic head space 260 and anodic head space 270 can provide collection regions for the gas expelled from the electrolyzer 220. In some embodiments, streams containing hydrogen gas, oxygen gas, and/or $CO_2$ in solution or small bubbles can be circulated out of the electrolyzer 220 for external degassing and then circulated back into the electrolyzer 220. In some embodiments, the hydrogen stream 222b and the $CO_2$ stream 226b can be contained by the cathodic head space 260. In some embodiments, the cathodic head space 260 can be substantially free of oxygen gas. In some embodiments, the oxygen stream 224b can be contained by the anodic head space 270. In some embodiments, the anodic head space 270 can be substantially free of $CO_2$ gas and hydrogen gas. In some embodiments, the anodic head space 270 can include a portion of $CO_2$ gas. As shown, the cathodic head space 260 is positioned above the cathode region 230 and the neutral region 240. In some embodiments, the cathodic head space 260 can be positioned above the cathode region 230 only. In some embodiments, the cathodic head space 260 can be positioned above the cathode region 230, the neutral region 240, and the anode region 250. As shown, the anodic head space 270 is positioned above the anode region 250 only. In some embodiments, the anodic head space 270 can be positioned above the anode region 250 and the neutral region 240.

In some embodiments, the amount of gas generated in the portion of the electrolyzer 220 positioned below the cathodic head space 260 can be different from the amount of gas generated in the portion of the electrolyzer positioned below the anodic head space 270. In such a case, a flow/pressure control apparatus (not shown) can be coupled to the cathodic head space 260 and/or the anodic head space 270 in order to limit the pressure gradient across the length of the electrolyzer 220. While a small pressure gradient across the length of the electrolyzer 220 can assist the flow of electrolyte from the anode region 250 to the cathode region 230, a significant pressure gradient can potentially disrupt the pH gradient and/or the chemical reactions occurring in the electrolyzer 220.

Figure 3:
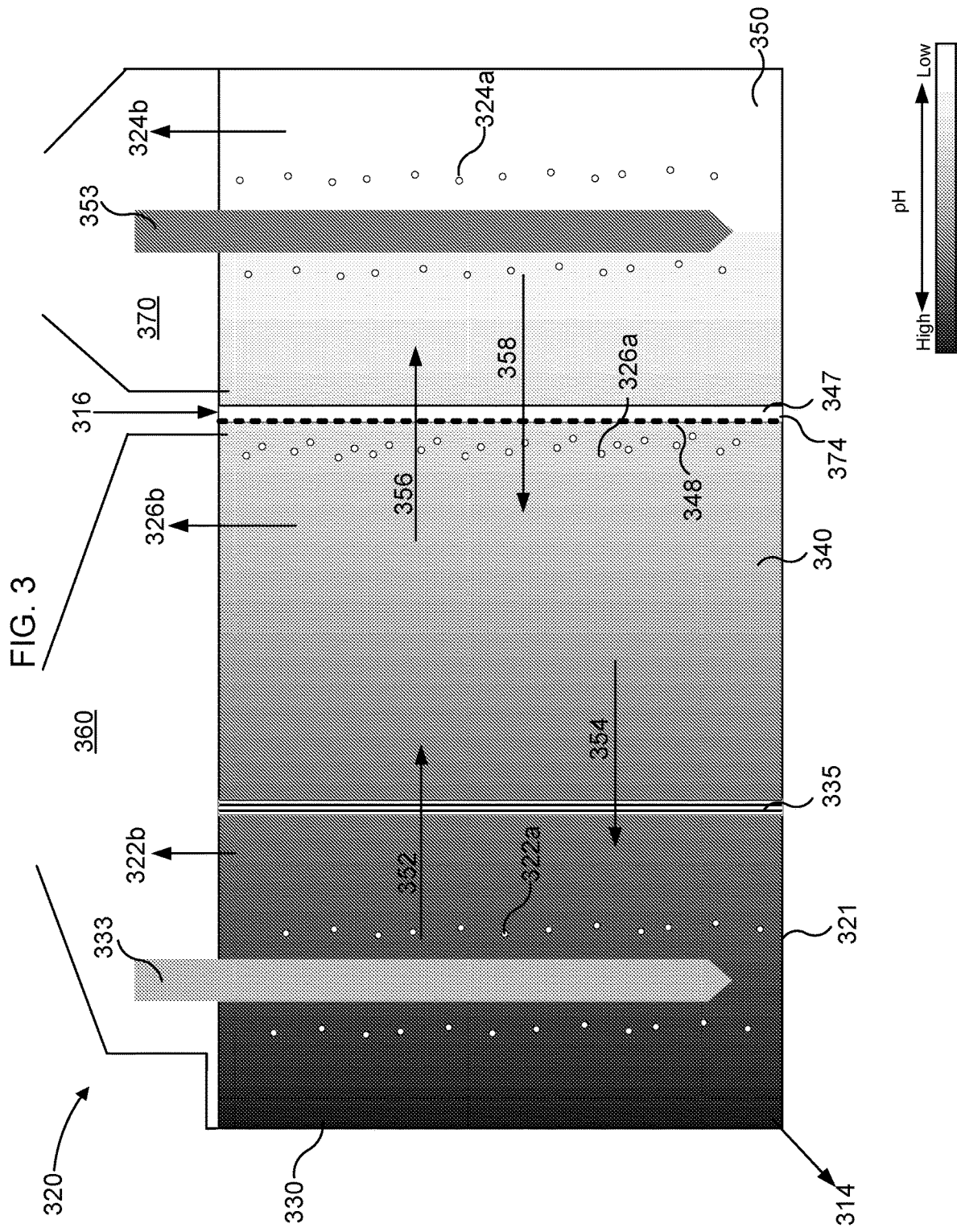
FIG. 3 shows an electrolyzer that can be incorporated in a system for production of synthetic fuel through $CO_2$ capture and water splitting, according to an embodiment.

FIG. 3 is an electrolyzer 320 that can be incorporated in a system for production of synthetic fuel through $CO_2$ capture and water splitting, according to an embodiment. In some embodiments, the electrolyzer 320 can be fluidically coupled to a $CO_2$ capture device (e.g. input 374, etc.). An alkaline solution 314 is expelled from the electrolyzer 320, while the electrolyzer 320 is fed by a DIC-rich solution 316. Hydrogen bubbles 322a, oxygen bubbles 324a, and $CO_2$ bubbles 326a form in the electrolyzer 320 and exit the electrolyzer as a hydrogen stream 322b, an oxygen stream 324b, and a $CO_2$ stream 326b, respectively. The electrolyzer 320 defines a volume 321 that includes a cathode region 330 with a cathode 333, a neutral region 340, and an anode region 350 with an anode 353. In some embodiments, the electrolyzer 320 can include a cathodic head space 360 and an anodic head space 370. In some embodiments, the electrolyzer 320 can include a cathodic divider 335 between the cathode region 330 and the neutral region 340. In some embodiments, the electrolyzer 320 can include an anodic divider 345 between the neutral region 340 and the anodic region 350. Electrochemical gradients in the electrolyzer 320 can cause migration of ionic species. Ionic flow path 352 represents flow of ionic species from the cathode region 330 to the neutral region 340. Ionic flow path 354 represents flow of ionic species from the neutral region 340 to the cathode region 330. Ionic flow path 356 represents flow of ionic species from the neutral region 340 to the anode region 350. Ionic flow path 358 represents flow of ionic species from the anode region 350 to the neutral region 340.

In some embodiments, the alkaline solution 314, the DIC-rich solution 316, the hydrogen bubbles 322a, the hydrogen stream 322b, the oxygen stream 324a, the oxygen stream 324b, the $CO_2$ bubbles 326a, the $CO_2$ stream 326b, the cathode region 330, the cathode 333, the neutral region 340, the anode region 350, the anode 353, the cathodic divider 335, the ionic flow paths 352, 354, 356, 358, the cathodic head space 360, and/or the anodic head space 370, can be the same or substantially similar to the alkaline solution 214, the DIC-rich solution 216, the hydrogen bubbles 222a, the hydrogen stream 222b, the oxygen stream 224a, the oxygen stream 224b, the $CO_2$ bubbles 226a, the $CO_2$ stream 226b, the cathode region 230, the cathode 233, the neutral region 240, the anode region 250, the anode 253, the cathodic divider 235, the ionic flow paths 252, 254, 256, 258, the cathodic head space 260, and/or the anodic head space 270, respectively, as described above with reference to FIG. 2.

In some embodiments, the input 374 of the electrolyzer 320 may include a distributor 347 that acts as a delivery conduit for the DIC-rich solution 316. As shown, the distributor 347 is inserted into the electrolyzer 320 between the cathodic head space 360 and the anodic head space 370. In some embodiments, the distributor 347 can have holes 348 only on the side closer to the cathode region 330, such that flow of the DIC-rich solution 316 is guided in the direction of the cathode region 330. In some embodiments, the distributor 347 can be a mesh. In some embodiments, the distributor 347 can be a tube with holes 348. In some embodiments, the distributor 347 can be designed such that flow from the distributor 347 is horizontal. In some embodiments, the distributor 347 can be embedded in or coupled to a divider or membrane that assists in keeping the oxygen bubbles 324a and oxygen stream 324b separate from the other gases released from the electrolyzer 320. In some embodiments, the distributor 347 can be embedded in or coupled to a divider that is the same or substantially similar to the anodic divider 245, as described above with reference to FIG. 2.

Figure 4:
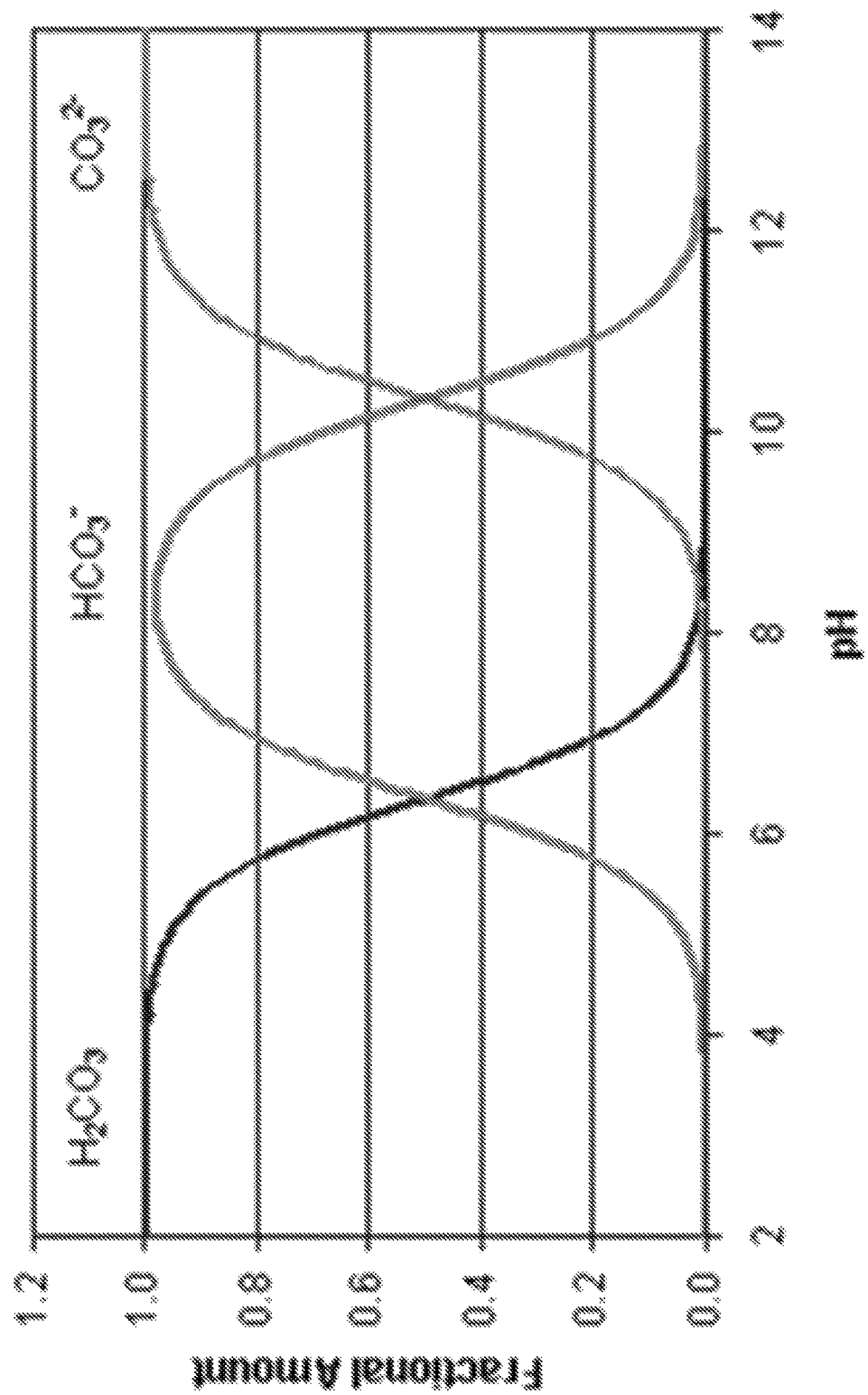
FIG. 4 shows a plot of relative carbonate fractions as a function of pH.

FIG. 4 graphically describes DIC fractional amounts as a function of pH, with reference to chemical equations 4, 5, and 6 described above. At pH values of about 10.5 or greater, carbonate ions are the dominant species. At pH values between about 6.5 and about 10.5, bicarbonate ions are the dominant species. At pH values less than about 6.5, carbonic acid is the dominant species, which typically breaks down to water and $CO_2$. Electrolyzers described herein can be designed with consideration of the pH gradient along the length of the electrolyzer in order to effectively target the region of the electrolyzer where the $CO_2$ gas forms.

Various embodiments of the systems and methods described herein, have been described as a single device that accomplishes the entire process. It should be noted, however, that in some embodiments, the system or method may include a series of interconnected sub-units or sub-methods that in total accomplish the processes contemplated herein.

It will be understood that implementations are not limited to the specific components disclosed herein, as virtually any components consistent with the intended operation of a method and/or system implementation for production of synthetic fuel through $CO_2$ capture and water splitting may be utilized. Accordingly, for example, although particular methods for $CO_2$ capture and water splitting may be disclosed, such components may comprise any shape, size, style, type, model, version, class, grade, measurement, concentration, material, weight, quantity, and/or the like consistent with the intended operation of a method and/or system implementation for production of synthetic fuel through $CO_2$ capture and water splitting may be used. In places where the description above refers to particular implementations of $CO_2$ capture and/or water splitting, it should be readily apparent that a number of modifications may be made without departing from the spirit thereof and that these implementations may be applied to other systems and methods for production of synthetic fuel.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations or equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

What is claimed is:

1. A system for producing gas streams for use in synthetic fuel production through $CO_2$ capture and water splitting, comprising:
    a $CO_2$ capture device configured to receive a $CO_2$-containing stream and comprising an aqueous alkaline solution, the aqueous alkaline solution comprising hydroxide ions and/or carbonate ions, the $CO_2$ capture device generating a carbon-rich solution when the aqueous alkaline solution absorbs $CO_2$ received from the $CO_2$-containing stream, the carbon-rich solution including carbonate ions and/or bicarbonate ions;
    an electrolyzer fluidically coupled to the $CO_2$ capture device, the electrolyzer defining a volume including an anode region having an anode, a cathode region having a cathode, and a neutral region between the cathode region and the anode region, the volume comprising an electrolyte solution having a pH gradient generated by the application of an electric current between the anode and the cathode, causing the electrolyte solution in the anode region to be acidic and the electrolyte solution in the cathode region to be alkaline; and
    a conduit placing the $CO_2$ capture device in fluid communication with the volume of the electrolyzer through a distributor disposed between the anode region and the neutral region, the distributor having a plurality of holes facing toward the neutral region and away from the anode region,
    wherein the carbon-rich solution is received into the volume of the electrolyzer; and
    wherein the electrolyzer generates a hydrogen product stream, an oxygen product stream, and a $CO_2$ product stream.

2. The system of claim 1, wherein the electrolyte solution comprises Na+ and/or K+ as a dominant cation.

3. The system of claim 1, wherein the electrolyzer delivers the aqueous alkaline solution back to the $CO_2$ capture device after making the aqueous alkaline solution carbon-lean by generating the $CO_2$ product stream.

4. The system of claim 1, wherein the cathode region of the electrolyzer is separated from the neutral region of the electrolyzer by a first divider, wherein the neutral region is between the cathode region and anode region.

5. The system of claim 4, wherein the anode region of the electrolyzer is separated from the neutral region of the electrolyzer by a second divider.

6. The system of claim 5, wherein the first divider and/or the second divider comprise a material that substantially prevents fluid circulation across the first divider and/or the second divider without substantially preventing electric ionic currents from crossing through the material.

7. The system of claim 4, wherein the first divider comprises a cationic membrane that substantially prevents fluid flow and anion flow across the first divider.

8. The system of claim 1, wherein the electrolyzer is disposed in a pressurized housing, and wherein the hydrogen product stream, the $CO_2$ product stream and the oxygen product stream are produced by the electrolyzer at a pressure greater than about 1 bar absolute.

9. The system of claim 1, wherein the conduit is a first conduit, and further comprising a second conduit, the second conduit placing an output of the electrolyzer in the cathode region in fluid communication with the $CO_2$ capture device.

10. An electrolyzer, comprising:
a volume having a cathode region, an anode region, and a neutral region between the cathode region and the anode region;
an electrolyte solution inside the volume having a pH gradient when an electric current is applied to the electrolyzer such that the electrolyte solution has a pH of less than about 6 in the anode region, a pH of greater than about 5 in the cathode region, and a pH of between about 6 and about 13 in the neutral region;
an output in the cathode region configured to remove an alkaline-rich solution from the electrolyzer; and
an input configured to supply a carbon-rich solution to the electrolyzer,
wherein the input is fluidically coupled to a distributor disposed between the anode region and the neutral region, the distributor having a plurality of holes facing toward the neutral region and away from the anode region.

11. The electrolyzer of claim 10, wherein the alkaline-rich solution comprises hydroxide ions and/or carbonate ions.

12. The electrolyzer of claim 10, wherein the carbon-rich solution comprises carbonate ions and/or bicarbonate ions.

13. The electrolyzer of claim 10, further comprising a cathodic head space over at least part of the cathode region, wherein the electrolyzer produces $CO_2$ gas in the neutral region, and a $CO_2$ gas stream exits the electrolyzer via the cathodic head space.

14. The electrolyzer of claim 10, wherein the electrolyte of the anode region comprises dissolved sulfate ions, suflite ions, and/or phosphate ions.

15. A method for producing gas streams for use in synthetic fuel production through $CO_2$ capture and water-splitting, comprising:
exposing an aqueous alkaline solution comprising hydroxide ions to a $CO_2$-containing gas region;
capturing $CO_2$ from the $CO_2$-containing gas region with the aqueous alkaline solution, forming a second solution comprising at least one of carbonate ions and bicarbonate ions;
introducing the second solution to an electrolyte composition within an electrolytic water-splitting cell, the electrolyte composition being acidic in an anode region of the cell and alkaline in a cathode region of the cell with a neutral region between the anode region and the cathode region, wherein the second solution is introduced to the electrolyte composition through a distributor disposed between the anode region and the neutral region, the distributor having a plurality of holes facing toward the neutral region and away from the anode region;
energizing the electrolytic water-splitting cell to produce hydrogen, oxygen, and $CO_2$ product streams, and to generate the aqueous alkaline solution in the cathode region; and
transporting the aqueous alkaline solution to the $CO_2$-containing gas region through a conduit that fluidically connects the cathode region and the $CO_2$-containing gas region.

16. The method of claim 15, further comprising:
expelling the $CO_2$ product stream and the hydrogen product stream via a cathodic head space.

17. The method of claim 16, wherein the cathodic head space is maintained at a pressure between about 1 bar and about 3 bar absolute.

18. The method of claim 15, further comprising:
expelling the oxygen product stream via an anodic head space.

* * * * *